United States Patent
Neely et al.

(10) Patent No.: US 9,027,333 B2
(45) Date of Patent: May 12, 2015

(54) SOOT PRE-LOADING OF PARTICULATE MATTER AFTERTREATMENT DEVICES AS MEANS FOR REDUCING HYDROCARBON EMISSIONS DURING COLD START

(71) Applicant: Southwest Research Institute, San Antonio, TX (US)

(72) Inventors: Gary D. Neely, Boerne, TX (US); Darius Mehta, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 1 day.

(21) Appl. No.: 13/932,598

(22) Filed: Jul. 1, 2013

(65) Prior Publication Data

US 2015/0000254 A1    Jan. 1, 2015

(51) Int. Cl.
*F01N 3/00*    (2006.01)
*F01N 3/02*    (2006.01)
*F01N 3/10*    (2006.01)
*F01N 3/20*    (2006.01)
*F01N 3/023*    (2006.01)
*F01N 3/035*    (2006.01)

(52) U.S. Cl.
CPC ............. *F01N 3/023* (2013.01); *F01N 3/035* (2013.01)

(58) Field of Classification Search
USPC ............. 60/274, 277, 297, 299, 300, 311
See application file for complete search history.

(56) References Cited

U.S. PATENT DOCUMENTS

2013/0008162 A1*  1/2013  Ruona et al. ............ 60/605.1
2013/0276445 A1*  10/2013  Chen et al. ............. 60/605.1

* cited by examiner

*Primary Examiner* — Kenneth Bomberg
*Assistant Examiner* — Dapinder Singh
(74) *Attorney, Agent, or Firm* — Chowdhury & Georgakis PC; Ann C. Livingston

(57) ABSTRACT

Methods and systems for reducing hydrocarbon emissions from an internal combustion engine. The engine's exhaust aftertreatment system has at least a particulate matter (soot) filter and means for actively regenerating the particulate matter filter. During operation of the engine, the soot loading state of the particulate matter filter is monitored. The filter is regenerated when required, but the regeneration is controlled so that the particulate matter filter retains a small level of soot loading. This soot "pre-loading" ensures hydrocarbon reduction during the next cold start.

20 Claims, 3 Drawing Sheets

US 9,027,333 B2

SOOT PRE-LOADING OF PARTICULATE MATTER AFTERTREATMENT DEVICES AS MEANS FOR REDUCING HYDROCARBON EMISSIONS DURING COLD START

TECHNICAL FIELD OF THE INVENTION

This invention relates to exhaust aftertreatment of exhaust from internal combustion engines, and more particularly to aftertreatment of exhaust that contains hydrocarbon emissions.

BACKGROUND OF THE INVENTION

Despite new technologies that significantly aid in reducing exhaust emissions from internal combustion diesel engines, NOx and particulate matter (PM) emissions are still a subject of environmental concern. The term "NOx" includes the mono-nitrogen oxides NO and NO2 (nitric oxide and nitrogen dioxide). Emission standards for vehicle engines are becoming increasingly stringent, and it is difficult to meet governmental emissions regulations by merely relying only on improvements to the engine itself. Thus, today's engines continue to require some sort of exhaust gas aftertreatment system.

Modern aftertreatment catalysts such as three-way catalysts for gasoline engines and diesel oxidation catalysts for diesel engines effectively oxidize unburned hydrocarbon emissions with very high efficiencies once the catalysts reach a minimum temperature. However, when an engine is started after a prolonged period of inactivity, the catalysts are cold and ineffective until they warm up. Emissions emitted during the warm-up period constitute the majority of emissions emitted from the tailpipe. Control of these "cold-start" emissions is critical for meeting current and future emissions standards.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to reducing tailpipe hydrocarbon (HC) emissions during start-up of an internal combustion engine. It is assumed that the engine is equipped with at least one particulate matter filter.

The term "particulate matter filter" may include various types of particulate matter collection devices, herein also referred to as "filters". The terms "particulate matter collection device" and "particulate matter filter" are used interchangeably herein. The filter may have a wall-flow or flow-through design or other design known or to be developed.

Furthermore, the particulate matter filter may be a self-contained emissions control device dedicated to collecting particulate matter. Or, it may be integrated with devices for control of emissions other than particulate matter, such as a particulate matter filter with a medium specially catalyzed to reduce certain gaseous emissions. A common feature of particulate matter filters is that they are used to reduce tailpipe particulate matter (soot) emissions. The filters work by collecting and storing particulate matter emitted from the engine.

The method described herein is especially suitable for internal combustion engines, but may also be suitable for other engines that produce hydrocarbon emissions in their exhaust. Although the description is in terms of an exhaust aftertreatment system of a type used for automotive vehicles, the exhaust aftertreatment system may be used to treat exhaust from an engine in applications other than vehicles.

Figure 1:
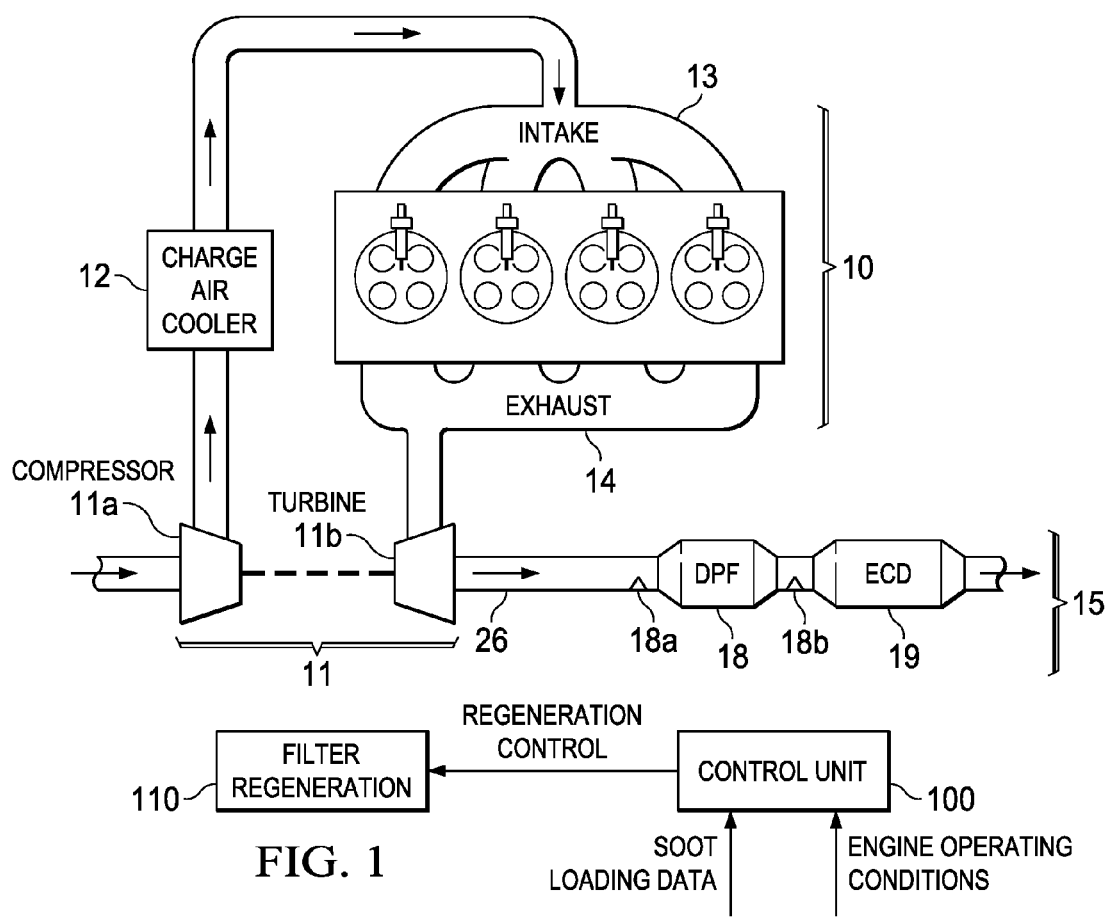
FIG. 1 illustrates an engine whose exhaust is delivered to a particulate matter filter that is maintained with a "soot pre-loading" process in accordance with the invention.

FIG. 1 illustrates an engine 10 whose exhaust is delivered to a particulate matter filter 18. In the illustrative embodiment, engine 10 is a diesel engine of an automotive vehicle, and is a forced induction engine having a turbocharger 11.

The engine's intake air is compressed by the turbocharger's compressor 11a, which is mechanically driven by its turbine 11b. Charged intake air is delivered to the engine cylinders via an intake manifold 13.

Exhaust gas is discharged from the engine's exhaust manifold 14 to an exhaust line 26. The flow of exhaust through the exhaust line 26 and through the elements of the aftertreatment system is indicated by the arrows.

In this example, main exhaust line 26 is equipped with two aftertreatment devices: a diesel particulate filter (DPF) 18 and a second emissions control device 19. For a diesel engine, this second device could be a lean NOx trap (LNT) 19 or other device for reducing pollutant emissions. As discussed below, if the particulate matter filter 18 is not catalyzed, it may be useful to install an oxidation catalyst as this second emissions control device or as an additional device.

Thus, for purposes of this description, it is assumed that the exhaust aftertreatment system has at least a particulate matter collection device, such as DPF 18. Additional aftertreatment devices, upstream or downstream of the particulate matter filter, may or may not also be present.

In the example of FIG. 1, DPF 18 is catalyzed with one or more platinum group metal catalysts. As discussed below, during cold-start, a catalyzed particulate matter filter enhances oxidation of hydrocarbon molecules.

Sensors 18a and 18b are pressure sensors, used to measure the pressure difference across the particulate matter filter 18. This is one way to determine the soot loading level of the filter. For example, the pressure difference might indicate that the filter has reached a maximum desired level of soot loading, indicating a need for regeneration. As used herein, "soot loading" refers to the amount of soot collected on or in the filter, and may be quantified relative to a maximum desired level of loading.

DPF 18 is of a type that is actively regenerated, using a regeneration process 110. Once a predetermined maximum level of soot storage is reached, the active filter regeneration process is initiated to increase the exhaust temperature high enough to oxidize the collected particulate matter. "Active regeneration", which introduces high heat into the exhaust system, can be distinguished from passive regeneration. The latter may be accomplished with the engine's exhaust heat in normal operation or by adding a catalyst to the filter.

Various active regeneration processes may be implemented. Examples of suitable processes are elevating the exhaust temperature with various means, such as with a burner or heater that heats the filter to soot combustion temperatures, or with engine programming to operate in a manner that elevates exhaust temperature or produces high amounts of NOx to oxidize the accumulated soot, or through other methods. Control unit 100 may be processor-based, having memory programmed to control various aspects of engine operation. In general, control unit 100 may be implemented with various controller devices known or to be developed. Further, control unit 100 may be part of a more comprehensive engine control unit that controls various other engine and/or emissions devices.

Control unit 100 is programmed to receive input signals and provide control signals, to implement the method described below. Particular to this description, control unit 100 receives one or more measurement signals that represent the loading state of the filter 18. This data allows control unit 100 to determine when regeneration of filter 18 is required and when to start and stop the regeneration process. Control unit 100 may receive input data for this purpose from pressure sensors 18a and 18, and deliver control signals to the regeneration process 110.

More specifically, based on pre-programmed set points, control unit 100 determines when to activate the regeneration process. During regeneration, diesel particulate matter burns when temperatures above a certain amount, for example 600 degrees Celsius, are attained. This temperature can be reduced by use of a catalyst. The actual temperature at which a filter will begin to oxidize hydrocarbon (soot burn-out) will depend on the particular regeneration process.

Conventionally, active regeneration is performed with sufficient duration and temperature to achieve burn-off of nearly all or most of the particulate matter that has been collected on the filter. In other words, the filter is regenerated until it retains minimal collected soot and/or it has regenerated until as much soot has been burned out as it practicable. As discussed below in connection with FIGS. 2 and 3, in conventional regeneration, the "soot loading" level is reduced to "low".

However, a feature of the method described herein is that the particulate matter filter 18 is not completely unloaded of particulate matter (soot) during the regeneration process. An exhaust system containing a particulate matter filter with some level of soot loading will reduce cold-start hydrocarbon emissions more effectively than a filter without soot.

Therefore, as a cold-start hydrocarbon emission control strategy, the surfaces of the particulate matter filter should retain a predetermined amount of soot loading. This amount of soot loading is determined as a level sufficient to ensure a desired level of hydrocarbon reduction during the next cold start-up.

The process of regenerating a particulate matter filter so that it has a predetermined amount of soot remaining after regeneration is referred to herein as "soot pre-loading". In the exhaust system of FIG. 1, for a diesel engine equipped with an actively regenerated DPF, soot pre-loading can be achieved by stopping the active filter regeneration process 110 prior to completely burning off the stored soot.

It is believed that the mechanism for the improved hydrocarbon reduction is a combination of adsorption and condensation of hydrocarbon molecules on the soot particles collected on the filter. For a filter catalyzed with platinum group metals (PGM), as the filter temperature increases, the released hydrocarbon molecules are oxidized by the catalyst.

For particulate matter filters that do not contain PGM, a downstream catalyst containing PGM could be used to perform the oxidation function. An example of a suitable catalyst is an oxidation catalyst.

Figure 2:
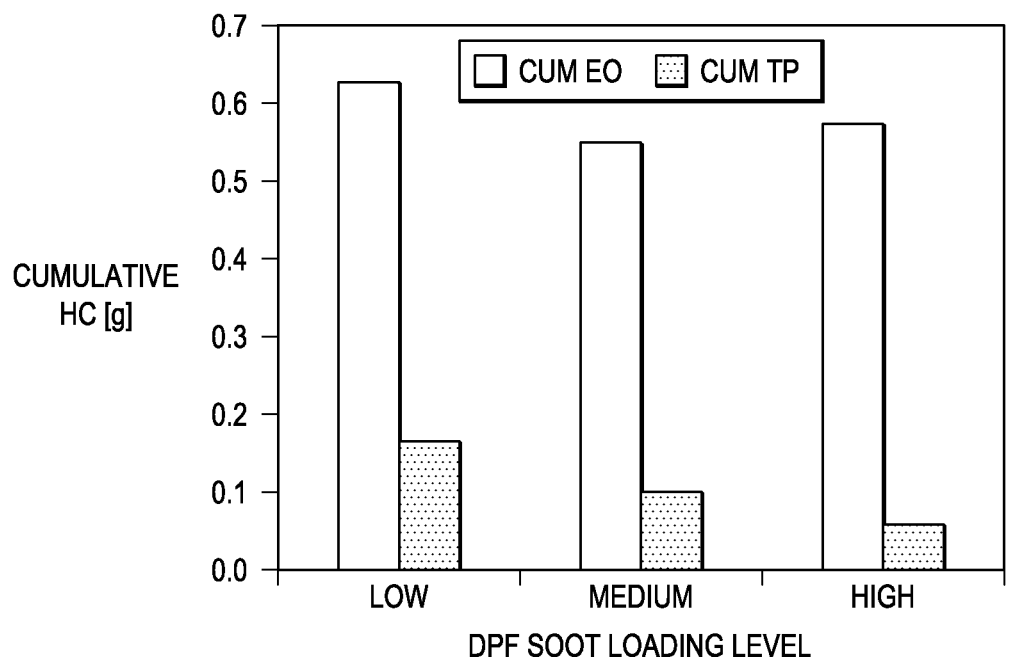
FIG. 2 illustrates the engine out and tailpipe hydrocarbon emissions for low, medium and high soot loading of a particulate matter filter.
Figure 3:
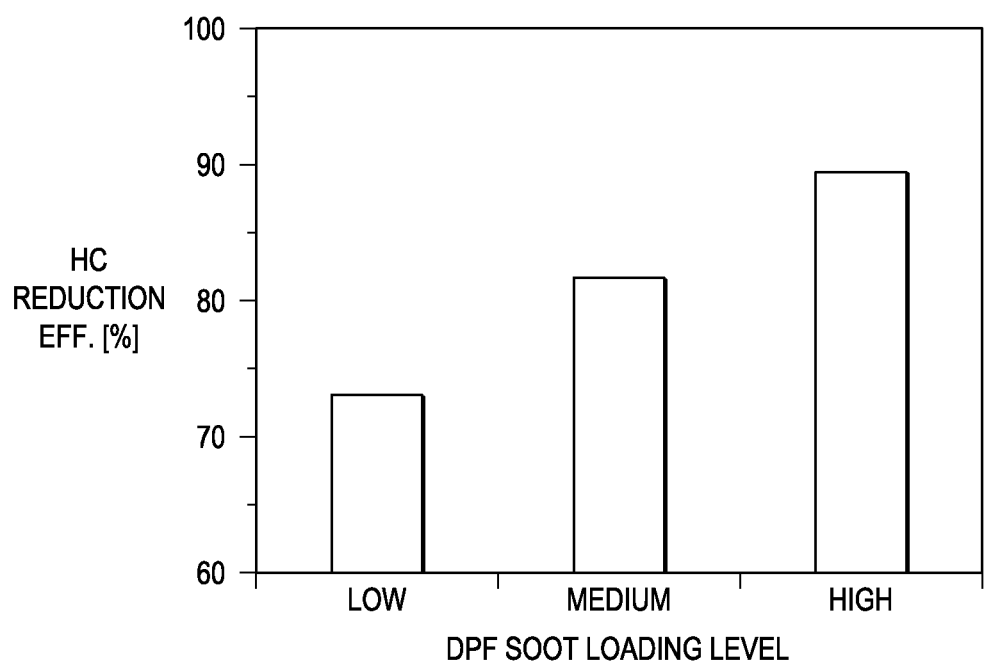
FIG. 3 illustrates the hydrocarbon reduction efficiency for low, medium and high soot loading of a particulate matter filter.

FIGS. 2 and 3 illustrate the effectiveness of soot pre-loading for a light-duty diesel engine equipped with a particulate matter filter, such as the engine of FIG. 1. The time period illustrated in both FIGS. 2 and 3 is the first 114 seconds of the standard FTP-75 test cycle. This test cycle, an EPA Federal Test Procedure, is part of a series of tests used to measure tailpipe emissions and fuel economy.

The FTP-75 test procedure requires a minimum cold-soak time before the engine can be started to begin the test cycle. During this cold-soak period, the ambient temperature is maintained near room temperature (around 25 degrees C.) so that the entire vehicle, including the exhaust treatment devices, is cold at start-up.

In both FIGS. 2 and 3, three levels of soot pre-loading of the DPF are illustrated: low, medium and high. "Low" soot loading represents a clean (no soot) filter. "Medium" soot loading represents some soot in the filter, and "high" represents some increase over medium. It should be understood, that the "high" level is well below the maximum soot loading level at which regeneration is performed.

In FIG. 2, for each soot pre-loading level, both the cumulative engine-out (EO) and tailpipe (TP) hydrocarbon emissions measured during the first 114 seconds of the FTP-75 following a cold start are shown. FIG. 3 shows, for each soot pre-loading level, the hydrocarbon reduction efficiency of the filter. At low soot loading, the 74% efficiency is exclusively due to hydrocarbon oxidation. At medium soot loading, in addition to the 74%, there is an additional 8% hydrocarbon reduction, due to the presence of the soot. At high soot loading, the efficiency is near 90%.

In practice, experimentation or modeling or other means can be used to determine a pre-soot loading level that will lead to increased hydrocarbon reduction efficiency during cold start without detriment to filter operation during other engine conditions.

Although the above description is in terms of cold start of a diesel engine, the soot pre-loading method is also applicable to gasoline engines that employ a gasoline particulate filter (GPF) or other particulate matter filter. In addition, it is reasonable to expect similar HC reduction on engines that employ other fuels that are stored as a liquid such as ethanol and biodiesel. It also applies to engines that use a combination of fuels, such as dual-fuel engines that use diesel and natural gas, or diesel and gasoline.

Figure 4:
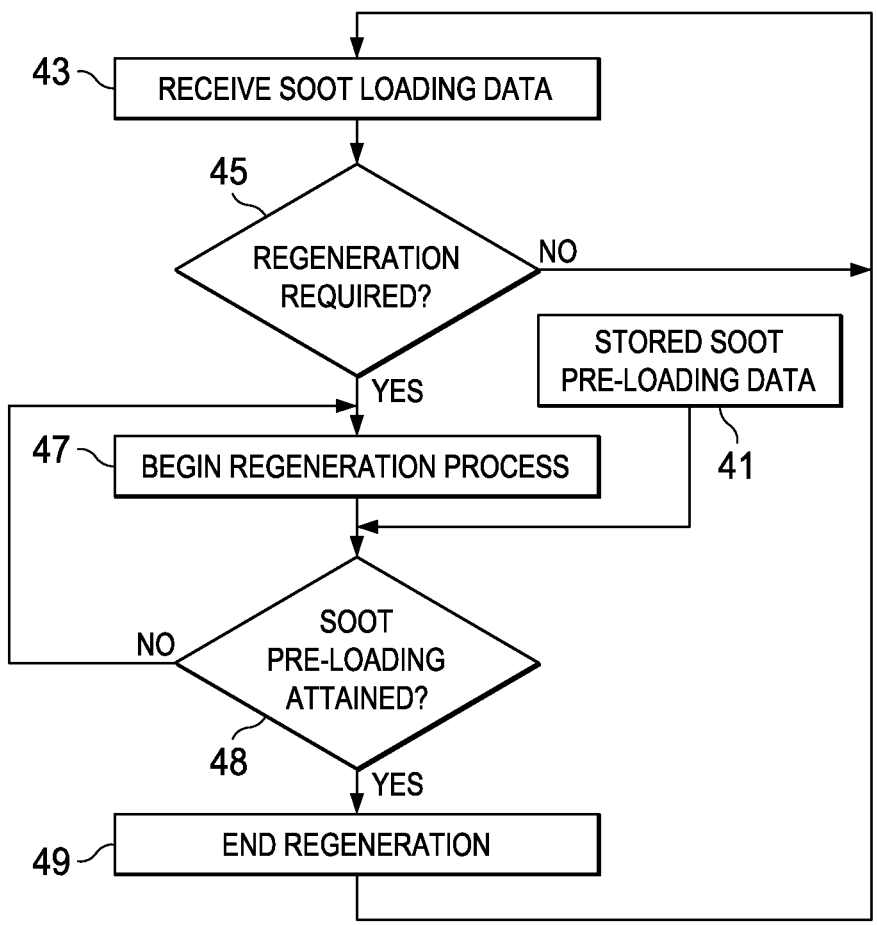
FIG. 4 illustrates a method of regenerating a particulate matter filter using a soot pre-loading.

FIG. 4 illustrates a method of reducing the hydrocarbon content of engine exhaust during cold start, by controlling regeneration of a particulate matter filter. In accordance with the above description, it is assumed that the engine's exhaust aftertreatment system has at least a particulate matter filter and a means for actively regenerating the filter. These means can include the various heaters and burners and other active processes to increase exhaust temperature discussed above.

Regardless of the specific regeneration process, a common feature is that the extent of regeneration can be controlled. In other words, instead of regeneration as a process that completely removes soot from the particulate matter filter, it is a process that can be controlled so that a predetermined amount of soot remains collected on the filter. The process performed by the steps of FIG. 4 can be performed by an appropriately programmed control unit, such as control unit 100.

Step 41 is storing data representing an amount of "soot pre-loading" to be retained on the particulate matter filter after regeneration. A given filter will have a "maximum" soot loading level, representing the level at which active regeneration is to be performed, and the soot pre-loading level could be expressed as a percentage of that maximum. Other parameters could be used. It is also possible that the soot pre-loading level could vary depending on engine operating conditions or conditions associated with the aftertreatment system.

The stored data can include data that maps soot pre-loading target levels to measurable data, such as the pressure differential across the filter. For example, referring again to FIGS. 2 and 3, once a desired pre-loading efficiency has been found, the soot load level at that efficiency can be related to the pressure difference at that load level.

Steps 43-49 are performed during engine operation. Data is monitored and regeneration performed in a manner that allows the filter to perform efficiently at all engine conditions and also increases its hydrocarbon removal during cold start conditions.

In Step 43, the control unit receives data representing the soot load level of the particulate matter filter. Measurement of the load level using sensors such as pressure sensors 18a and 18b, is a "direct" way to provide control unit 19 with appropriate input data. However, the method might also be implemented by programming control unit 100 to perform a model-based control strategy. In general, various "soot load input data" can be used to estimate the current amount of soot loading on the filter.

In Step 45, based on the soot load input data, the control unit determines whether regeneration is required. This is achieved by comparing the soot load input data with stored load setpoint data. One setpoint represents the maximum soot loading level to be reached before active regeneration is required. This setpoint may be the same for all engine operating conditions or it may vary.

In general, active regeneration is performed when the filter reaches a load state that indicates it is close to causing excessive exhaust restriction (back pressure) or a soot load level that has increased risk or uncontrolled regeneration. Conventional parameters for determining when to initiate regeneration may be used. If regeneration is not required, the control unit continues to monitor the soot loading data.

In Step 47, if it is time for regeneration, the control unit delivers appropriate control signals to begin the regeneration process. As discussed above, one of various active regeneration processes may be implemented.

In Step 48, the regeneration process is monitored to determine if the desired amount of soot burn-off has been obtained. As discussed above, the burn-off (soot unloading) is controlled so that a predetermined amount of soot pre-loading is retained on the filter.

In Step 49, once the regeneration has been performed to the desired soot pre-loading level, the regeneration process is halted. Again, this may be achieved using appropriate control signals from a control unit. The control unit then resumes its monitoring mode, so that it can determine when the next regeneration process should be performed. The filter, having retained its pre-loading level of soot, now begins to collect soot until the next regeneration event.

What is claimed is:

1. A method of reducing the hydrocarbon content of exhaust from an engine, comprising:
    providing an exhaust aftertreatment system having at least a particulate matter filter;
    providing a filter regenerator operable to actively regenerate the particulate matter filter;
    determining an amount of soot loadin of the s articulate matter filter that will result in a desired efficiency of hydrocarbon reduction during cold start engine conditions, thereby determining an amount of soot to be retained by the particulate matter filter after regeneration;
    storing maximum soot load data representing a maximum soot load level at which time the particulate matter filter is to be regenerated;
    storing pre-load soot level data representing the amount of soot to be retained by the particulate matter filter after regeneration;
    during operation of the engine performing the following tasks: receiving current soot load data representing the current soot loading state of the particulate matter filter; regenerating the particulate matter filter when the current soot load data indicates that the maximum soot load level has been reached; and ceasing the regenerating process when the particulate matter filter retains the pre-load soot level.

2. The method of claim 1, wherein the particulate matter filter is catalyzed with a PGM (platinum group metal) catalyst.

3. The method of claim 1, wherein the step of receiving current soot load data is performed by measuring the pressure difference across the particulate matter filter.

4. The method of claim 1, wherein the means for actively regenerating is performed by raising the temperature of the exhaust and/or the filter.

5. The method of claim 1, wherein the means for actively regenerating is one or more of the following: elevating the exhaust temperature with various a burner or heater that heats the filter and/or the exhaust, or operating the engine in a manner that elevates exhaust temperature or increases the amount of engine-out NOx.

6. The method of claim 1, wherein the engine is a diesel engine and the particulate matter filter is a diesel particulate filter.

7. The method of claim 1, wherein the engine is a gasoline engine and the particulate matter filter is a gasoline particulate filter.

8. The method of claim 1, wherein the engine uses ethanol and biodiesel as fuel.

9. The method of claim 1, wherein the engine uses a combination of fuels.

10. The method of claim 1, further comprising providing an oxidation catalyst downstream the particulate matter filter.

11. An exhaust aftertreatment system for reducing the hydrocarbon content of exhaust from an engine, comprising:
    one or more exhaust aftertreatment devices, at least one of which is a particulate matter filter;
    a filter regenerator operable to actively regenerate the particulate matter filter;
    data memory for storing maximum soot load data representing a maximum soot level at which time the particulate matter filter is to be regenerated, and pre-load soot level data representing a soot level to be retained by the particulate matter filter after regeneration;
    wherein the pre-load soot level is an amount of soot loading of the particulate matter filter that will result in a desired efficiency of hydrocarbon reduction during cold start engine conditions;
    a control unit programmed to perform the following tasks during operation of the engine: receiving current soot load data representing the current soot loading state of the particulate matter filter; regenerating the particulate matter filter when the current soot load data indicates that the maximum soot load level has been reached; and ceasing the regenerating process when the particulate matter filter retains the pre-load soot level.

12. The system of claim 11, wherein the particulate matter filter is catalyzed with a PGM (platinum group metal) catalyst.

13. The system of claim 11, wherein the task of receiving current soot load data is performed by measuring the pressure difference across the particulate matter filter.

14. The system of claim 11, wherein the means for actively regenerating is performed by raising the temperature of the exhaust and/or the filter.

15. The system of claim 11, wherein the means for actively regenerating is one or more of the following: elevating the exhaust temperature with various a burner or heater that heats the filter and/or the exhaust, or operating the engine in a manner that elevates exhaust temperature or increases the amount of engine-out NOx.

16. The system of claim 11, wherein the engine is a diesel engine and the particulate matter filter is a diesel particulate filter.

17. The system of claim 11, wherein the engine is a gasoline engine and the particulate matter filter is a gasoline particulate filter.

18. The system of claim 11, wherein the engine uses ethanol and biodiesel as fuel.

19. The system of claim 11, wherein the engine uses a combination of fuels.

20. The system of claim 11, further comprising an oxidation catalyst downstream the particulate matter filter.

* * * * *